(12) United States Patent
Kyono

(10) Patent No.: US 9,323,480 B2
(45) Date of Patent: Apr. 26, 2016

(54) IMAGE FORMING SYSTEM, PRINT DATA MANAGEMENT DEVICE, AND METHOD OF CONTROLLING PRINT DATA MANAGEMENT DEVICE

(75) Inventor: Hiroshi Kyono, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 772 days.

(21) Appl. No.: 13/351,536

(22) Filed: Jan. 17, 2012

(65) Prior Publication Data
US 2012/0188599 A1 Jul. 26, 2012

(30) Foreign Application Priority Data

Jan. 20, 2011 (JP) ................................. 2011-009955

(51) Int. Cl.
*G06F 3/12* (2006.01)
*G06K 15/00* (2006.01)
*G06K 15/02* (2006.01)

(52) U.S. Cl.
CPC ............ *G06F 3/1203* (2013.01); *G06F 3/1273* (2013.01); *G06F 3/1288* (2013.01); *G06K 15/1818* (2013.01); *G06K 15/4005* (2013.01)

(58) Field of Classification Search
None
See application file for complete search history.

(56) References Cited

U.S. PATENT DOCUMENTS

| | | | | |
|---|---|---|---|---|
| 6,985,243 B1* | 1/2006 | Matsueda | ..................... | 358/1.15 |
| 2004/0243734 A1* | 12/2004 | Kitagawa et al. | ............... | 710/13 |
| 2005/0275867 A1* | 12/2005 | Higashiura et al. | .......... | 358/1.14 |
| 2009/0174893 A1* | 7/2009 | Fujii et al. | .................... | 358/1.15 |
| 2010/0245902 A1* | 9/2010 | Sugiyama | .................... | 358/1.15 |
| 2010/0290081 A1* | 11/2010 | Uchida | ......................... | 358/1.15 |

FOREIGN PATENT DOCUMENTS

| | | |
|---|---|---|
| JP | 2004-001320 A | 1/2004 |
| JP | 2008-107921 A | 5/2008 |

* cited by examiner

*Primary Examiner* — Dov Popovici
(74) *Attorney, Agent, or Firm* — Harness, Dickey & Pierce, P.L.C.

(57) ABSTRACT

An image forming system including a print data management device and an image forming apparatus, the image forming apparatus receiving print data associated with a print job from a print data management device, if the print data is associated with a first operation and the print data management device is in an enabled state, receiving the print data from an information processing apparatus, if the print data is associated with a second operation, receiving the print data from the information processing apparatus, if the print data management device is in a disabled state, printing the print data associated with the print job on a recording medium, generating history information relating to the print job, the history information including identification information identifying whether the print job that has been printed is associated with the first operation or the second operation, and transmitting the history information to the print data management device.

15 Claims, 8 Drawing Sheets

| JOB ID | DOCUMENT NAME | USER NAME | INPUT TIME | INPUT TIME | DIRECT PRINTING | |
|---|---|---|---|---|---|---|
| 001 | XXX | user01 | xxxx/xx/xx xx:xx | xxxx/xx/xx xx:xx | | ... |
| 002 | XXX | user02 | xxxx/xx/xx xx:xx | xxxx/xx/xx xx:xx | | |
| 003 | XXX | user03 | xxxx/xx/xx xx:xx | xxxx/xx/xx xx:xx | | |
| 004 | XXX | user04 | xxxx/xx/xx xx:xx | xxxx/xx/xx xx:xx | | |
| ⋮ | | | | | | |

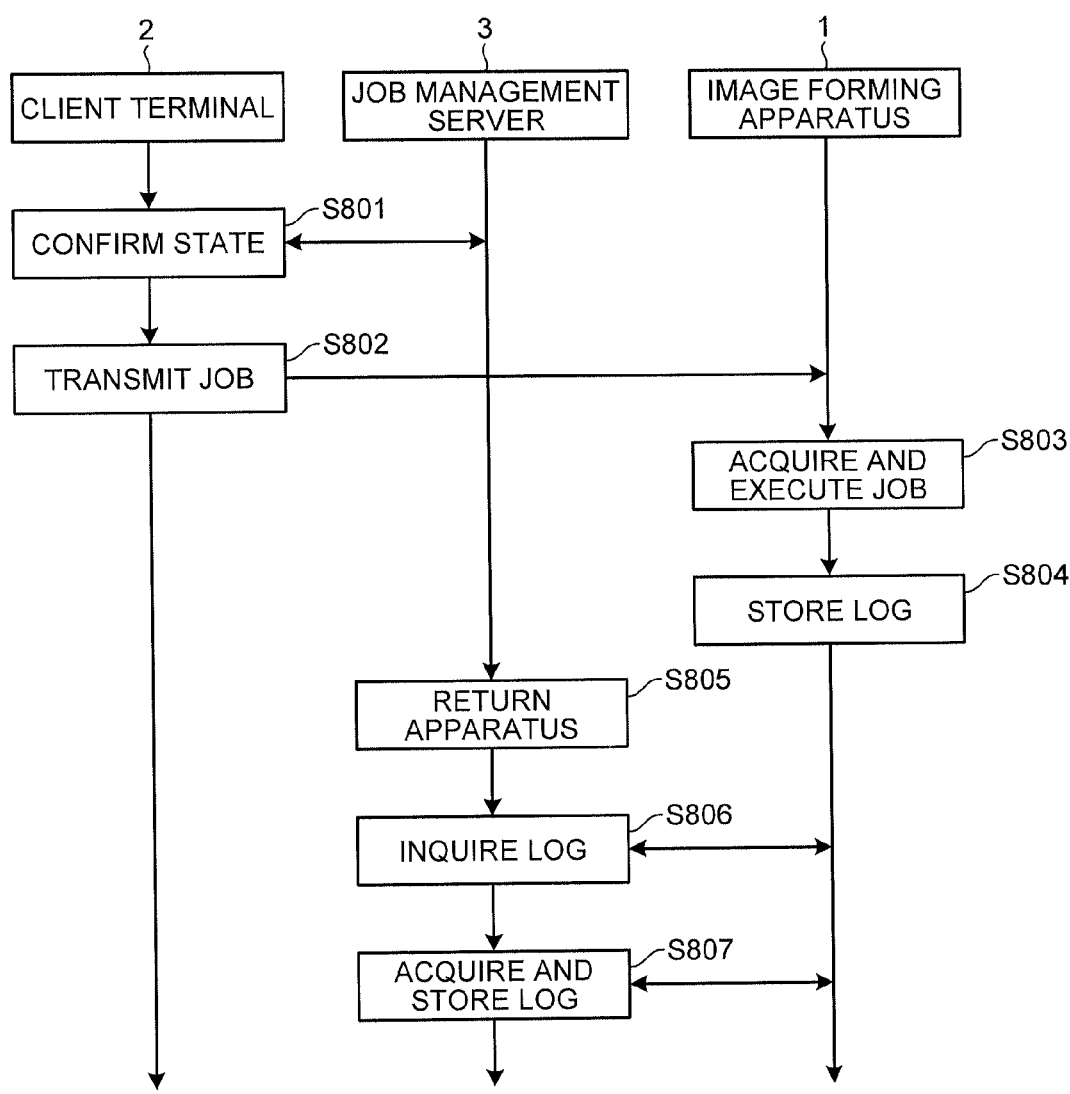

FIG.9A

| JOB ID | DOCUMENT NAME | USER NAME | INPUT TIME | INPUT TIME | DIRECT PRINTING | ... |
|---|---|---|---|---|---|---|
| 003 | XXX | user01 | xxxx/xx/xx xx:xx | xxxx/xx/xx xx:xx | YES | |
| 004 | XXX | user02 | xxxx/xx/xx xx:xx | xxxx/xx/xx xx:xx | YES | |

FIG.9B

| JOB ID | DOCUMENT NAME | USER NAME | INPUT TIME | INPUT TIME | DIRECT PRINTING | ... |
|---|---|---|---|---|---|---|
| 001 | XXX | user01 | xxxx/xx/xx xx:xx | xxxx/xx/xx xx:xx | | |
| 002 | XXX | user02 | xxxx/xx/xx xx:xx | xxxx/xx/xx xx:xx | | |

FIG.9C

| JOB ID | DOCUMENT NAME | USER NAME | INPUT TIME | INPUT TIME | DIRECT PRINTING | ... |
|---|---|---|---|---|---|---|
| 001 | XXX | user01 | xxxx/xx/xx xx:xx | xxxx/xx/xx xx:xx | | |
| 002 | XXX | user02 | xxxx/xx/xx xx:xx | xxxx/xx/xx xx:xx | | |
| 003 | XXX | user03 | xxxx/xx/xx xx:xx | xxxx/xx/xx xx:xx | 1a | |
| 004 | XXX | user04 | xxxx/xx/xx xx:xx | xxxx/xx/xx xx:xx | 1a | |

FIG.9D

| JOB ID | DOCUMENT NAME | USER NAME | INPUT TIME | INPUT TIME | DIRECT PRINTING | ... |
|---|---|---|---|---|---|---|
| 003 | XXX | user01 | xxxx/xx/xx xx:xx | xxxx/xx/xx xx:xx | COLLECTED | |
| 004 | XXX | user02 | xxxx/xx/xx xx:xx | xxxx/xx/xx xx:xx | COLLECTED | |

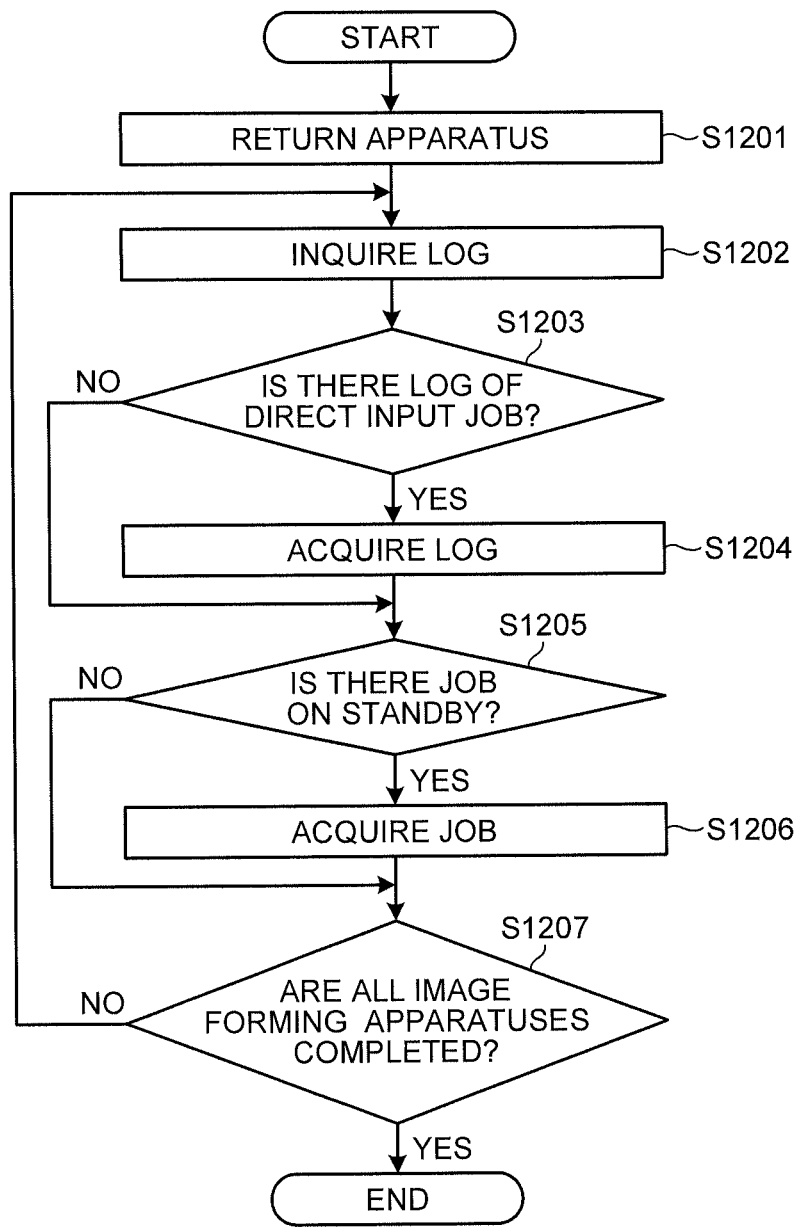

IMAGE FORMING SYSTEM, PRINT DATA MANAGEMENT DEVICE, AND METHOD OF CONTROLLING PRINT DATA MANAGEMENT DEVICE

CROSS-REFERENCE TO RELATED APPLICATIONS

The present application claims priority to and incorporates by reference the entire contents of Japanese Patent Application No. 2011-009955 filed in Japan on Jan. 20, 2011.

BACKGROUND OF THE INVENTION

1. Field of the Invention

The present invention relates to an image forming system, a print data management device, and a method of controlling a print data management device. In particular, the present invention relates to a technique for managing history of output operations of formed images.

2. Description of the Related Art

Recently, digitization of information has been promoted and thus image processing apparatuses are inevitable. For example, a printer or a facsimile for outputting digitized information, and a scanner for digitizing documents are used. The image processing apparatus includes an imaging function, an image forming function, a communication function, and the like; and in many cases, the image processing apparatus is of a multi-function peripheral which can be used as a printer, a facsimile, a scanner, and a copy machine.

From among the image processing apparatuses, as a system which uses a printer to output digitized information, a pull print system is known in which a print job generated in an information processing apparatus, such as a personal computer (PC), is stored in a server; and the printer side acquires a print job through access to the server to form and output the image (for example, see Japanese Patent Application Laid-open No. 2008-107921).

In the system described in Japanese Patent Application Laid-open No. 2008-107921, since it is assumed that the server manages the print job, when the server is in a disabled state, it is difficult for the PC to transmit the print job, for the server to store the print job, and for the printer to acquire the print job through access to the server. With a spare server provided, it is possible to solve the above problems, but the problem with such a solution is that introduction and management of a server requires an additional cost. Moreover, since the print job is managed by a plurality of servers, log information is distributed, and thus centralized management cannot be performed.

When the server is in disabled state, a direct print job may be transmitted from the PC to the printer, so outputting of a printing job is not disabled. However, in this case, log information is not left on the server side during the disabled state of the server, so that centralized management of log information cannot be performed.

SUMMARY OF THE INVENTION

It is an object of the present invention to at least partially solve the problems in the conventional technology.

According to an embodiment, there is provided an image forming system that includes: an information processing apparatus that generates and transmits print data; a print data management device that accumulates the transmitted print data and manages print data and log information concerning print data; and an image forming apparatus that prints print data, the information processing apparatus, the print data management device, and the image forming apparatus being communicably connected together. The information processing apparatus includes: a print data generating unit that generates print data, and a print data transmission unit that transmits the print data to either the print data management device or the image forming apparatus in accordance with the operation state of the print data management device. The image forming apparatus includes a print data acquiring unit that acquires the print data from the print data management device, a print data storage unit that stores the print data transmitted from the information processing apparatus into a storage medium, a print output unit that outputs the print data, and a history information holding unit that, when the print data output from the print output unit is print data received from the information processing apparatus, generates history information relating to print output added with identification information for identifying output using print data received from the information processing apparatus and stores the history information into the storage medium. The print data management device includes a print data managing unit that manages and stores the print data transmitted from the information processing apparatus into storage medium, a request print data transmission unit that transmits the print data stored in the storage medium to the image forming apparatus in response to a request from the image forming apparatus, a history information generating unit that generates history information for the print data managed by the print data managing unit, a history information acquiring unit that, from the image forming apparatus, acquires at least the history information added with the identification information from among the history information relating to print output stored in the storage medium of the image forming apparatus at a predetermined timing, and a history information managing unit that manages and stores the history information into the storage medium.

According to another embodiment, there is provided a print data management device for an image forming system that includes: an information processing apparatus that generates and transmits print data, the print data management device that accumulates the transmitted print data and manages the print data and log information concerning the print data, and an image forming apparatus that prints the print data. The information processing apparatus transmits the print data to either the print data management device or the image forming apparatus in accordance with the operation state of the print data management device. When the print data is print data received from the information processing apparatus, the image forming apparatus generates and outputs history information relating to print output that is added with identification information for identifying an output using print data received from the information processing apparatus and stores the history information into the storage medium. The print data management device includes: a print data managing unit that manages and stores the print data transmitted from the information processing apparatus into the storage medium; a request print data transmission unit that transmits the print data stored in the storage medium to the image forming apparatus in response to a request from the image forming apparatus; a history information generating unit that generates history information for the print data managed by the print data managing unit; a history information acquiring unit that, from the image forming apparatus, acquires at least the history information added with the identification information from among the history information relating to print output stored in the storage medium of the image forming apparatus at a predetermined timing; and a history information managing unit that manages and stores the history information into the storage medium.

According to still another embodiment, there is provided a method of controlling a print data management device for an image forming system that includes: an information processing apparatus that generates and transmits print data, the print data management device that accumulates the transmitted print data and manages the print data and log information concerning the print data, and an image forming apparatus that prints the print data. The information processing apparatus transmits the print data to either the print data management device or the image forming apparatus in accordance with the operation state of the print data management device. When the print data is print data received from the information processing apparatus, the image forming apparatus generates and outputs history information relating to print output that is added with identification information for identifying an output using print data received from the information processing apparatus and stores the history information into the storage medium. The method includes: storing and managing the print data transmitted from the information processing apparatus into the storage medium; transmitting the print data stored in the storage medium to the image forming apparatus in response to a request from the image forming apparatus; generating history information for the print data managed by the print data managing unit; from the image forming apparatus, acquiring at least the history information added with the identification information from among the history information relating to print output stored in the storage medium of the image forming apparatus at a predetermined timing; and storing and managing the history information into the storage medium.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a sequence diagram illustrating a normal operation of a system;

FIG. 8 is a sequence diagram illustrating an operation of a system;

FIGS. 9A to 9D are diagrams illustrating an example of log information;

FIG. 12 is a flowchart illustrating the operation of a job management server.

DETAILED DESCRIPTION OF THE PREFERRED EMBODIMENTS

Hereinafter, an embodiment will be described in detail. In this embodiment, as an example of an image forming system, a pull print system will be described in which a print job generated in an information processing apparatus, that is, print data is primarily stored in a server, the print job is acquired through access to the server from an image forming apparatus side, and image formation output is performed.

Figure 1:
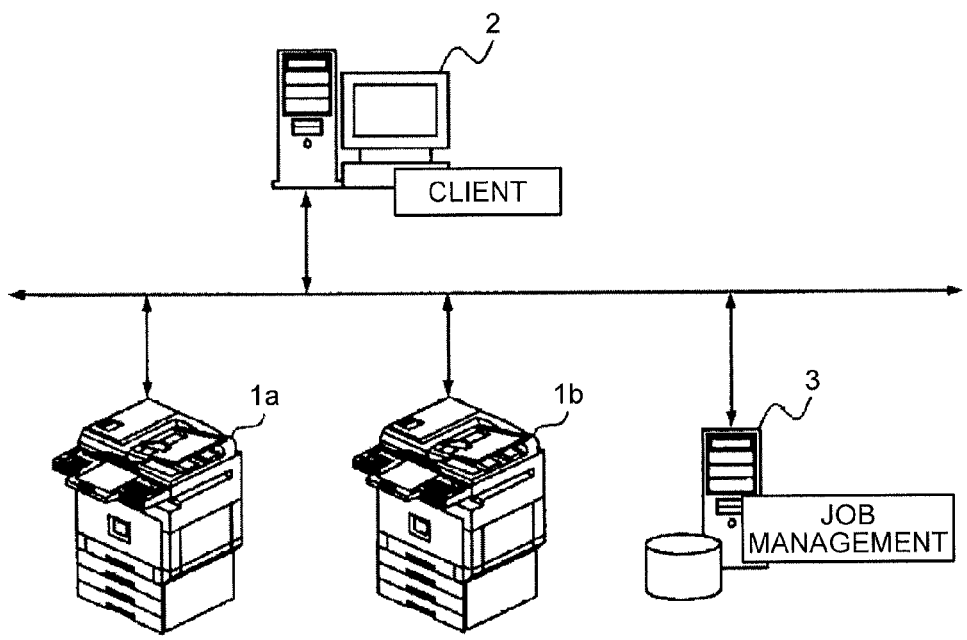
FIG. 1 is a diagram illustrating the operation form of a system according to an embodiment.

FIG. 1 is a diagram illustrating an example of the operation form of a system of this embodiment. As illustrated in FIG. 1, the system of this embodiment has a configuration in which an image forming apparatus 1a, an image forming apparatus 1b, a client terminal 2, and a job management server 3 are connected together through a network.

The image forming apparatuses 1a and 1b (hereinafter, collectively referred to as an image forming apparatus 1) are multi-function peripherals (MFPs) which include an imaging function, an image forming function, a communication function, and the like, and are usable as a printer, a facsimile, a scanner, and a copy machine. In this embodiment, the image forming apparatus 1 accesses the job management server 3 in accordance with an operation of a user, acquires a print job stored in the job management server 3, and performs image formation output.

The client terminal 2 is an information processing terminal which is operated by the user, and is formed as an information processing apparatus, such as a personal computer (PC). When generating and outputting a print job, in principle, the client terminal 2 of this embodiment transmits the print job to the job management server 3, but when the job management server 3 is in the disabled state, the client terminal 2 transmits the print job to the image forming apparatus 1.

The job management server 3 functions as a print data management device which receives the print job from the client terminal 2, temporarily stores the print job, and outputs the print job in accordance with access from the image forming apparatus 1. Accordingly, log information of the print job is accumulated in the job management server 3. When having returned from the disabled state, the job management server 3 of this embodiment accesses the image forming apparatus 1, and collects the log of image formation output in the image forming apparatus 1 in the disabled state. This process is one of the subject matters of this embodiment. In FIG. 1, the function of the job management server 3 is realized as a server, and may be realized by an MFP, such as the image forming apparatus 1.

Figure 2:
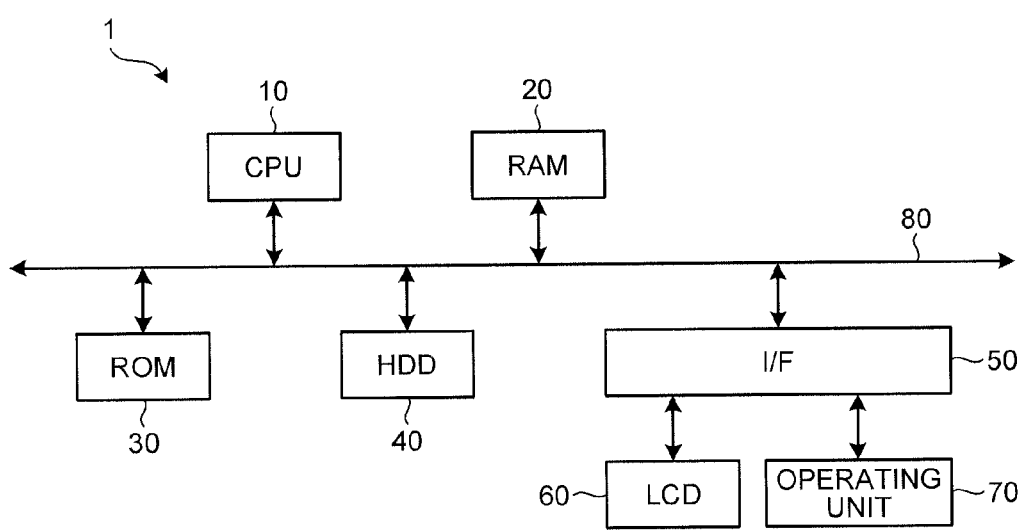
FIG. 2 is a block diagram schematically illustrating the hardware configuration of a job management server.

Next, the hardware configuration of the image forming apparatus 1, the client terminal 2, and the job management server 3 of this embodiment will be described. FIG. 2 is a block diagram illustrating the hardware configuration of the job management server 3 of this embodiment. The image forming apparatus 1 includes an engine for realizing a scanner, a printer, or the like, in addition to the hardware configuration illustrated in FIG. 2. Although in the following description, the hardware configuration of the job management server 3 will be described, the same is applied to the image forming apparatus 1 and the client terminal 2.

As illustrated in FIG. 2, the job management server 3 of this embodiment has the same configuration as a general server, a PC, or the like. That is, in the job management server 3 of the embodiment, a central processing unit (CPU) 10, a random access memory (RAM) 20, a read only memory (ROM) 30, a hard disk drive (HDD) 40, and an I/F 50 are connected together through a bus 80. A liquid crystal display (LCD) 60 and an operating unit 70 are connected to the I/F 50.

The CPU 10 is an arithmetic unit and controls the overall operation of the job management server 3. The RAM 20 is a volatile storage medium in which information is readable and writable at high speed, and is used as a work area when the CPU 10 processes information. The ROM 30 is a nonvolatile read-only storage medium, and stores a program, such as firmware. The HDD 40 is a nonvolatile storage medium in which information is readable and writable, and stores an operating system (OS), various control programs, application programs, and the like.

The I/F 50 connects and controls the bus 80 and various kinds of hardware, a network, or the like. The LCD 60 is a visual user interface which is used to confirm the state of the job management server 3. The operating unit 70 is a user interface, such as a keyboard or a mouse, which is used when the user inputs information to the job management server 3. As described with reference to FIG. 1, the job management server 3 of this embodiment is operated as a server. Accordingly, the user interface, such as the LCD 60 and the operating unit 70, may not be provided.

In the hardware configuration, a program stored in a storage medium, such as the ROM 30, the HDD 40, or an optical disk (not illustrated), is read to the RAM 20 and operated under the control of the CPU 10. Thus, a software controller is constituted. A combination of the software controller constituted as above and hardware constitutes functional blocks which realize the functions of the image forming apparatus 1, the client terminal 2, and the job management server 3 of this embodiment.

Figure 3:
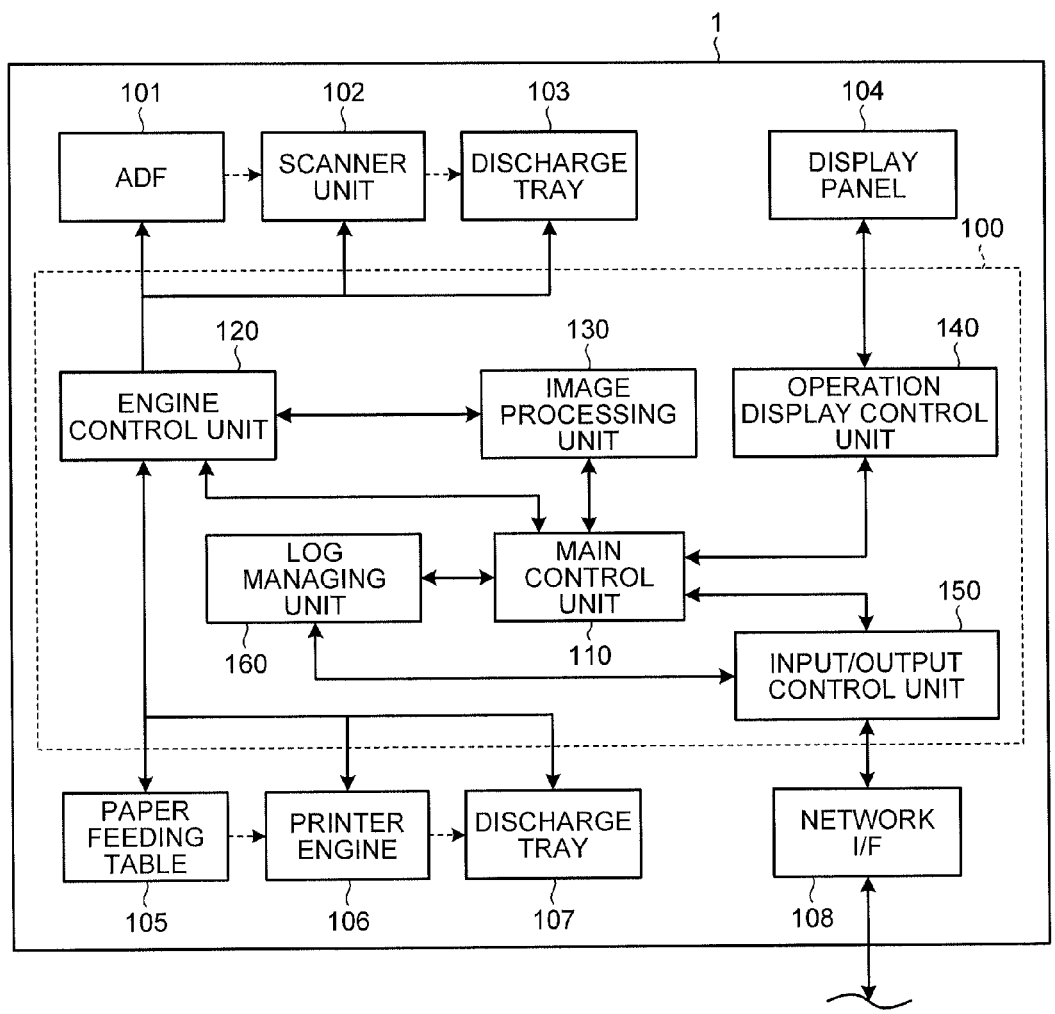
FIG. 3 is a block diagram illustrating the functional configuration of an image forming apparatus.

Next, the functional configuration of the image forming apparatus 1 of this embodiment will be described with reference to FIG. 3. FIG. 3 is a block diagram illustrating the functional configuration of the image forming apparatus 1 of this embodiment. As illustrated in FIG. 3, the image forming apparatus 1 of this embodiment has a controller 100, an auto document feeder (ADF) 101, a scanner unit 102, a discharge tray 103, a display panel 104, a paper feeding table 105, a printer engine 106, a discharge tray 107, and a network I/F 108.

The controller 100 includes a main control unit 110, an engine control unit 120, an image processing unit 130, an operation display control unit 140, an input/output control unit 150, and a log managing unit 160. As illustrated in FIG. 3, the image forming apparatus 1 of this embodiment is constituted as a multi-function peripheral having the scanner unit 102 and the printer engine 106. In FIG. 3, electrical connection is indicated by a solid-line arrow, and the flow of a sheet or document is indicated by a broken-line arrow.

The display panel 104 serves as an output interface which visually displays the state of the image forming apparatus 1, as well as an input interface which is a touch panel and is used when the user directly operates the image forming apparatus 1 or inputs information to the image forming apparatus 1. That is, the display panel 104 includes a function of displaying an image which is used to receive an operation of the user. The display panel 104 is realized by the LCD 60 and the operating unit 70 illustrated in FIG. 2. In this embodiment, the user operates the display panel 104 to issue an instruction to select and acquire a print job stored in the job management server 3.

The network I/F 108 is an interface which is used when the image forming apparatus 1 performs communication with another apparatus, such as the client terminal 2 or the job management server 3, through a network. Ethernet (Registered Trademark) or a universal serial bus (USB) interface is used. The network I/F 108 is realized by the I/F 50 illustrated in FIG. 2. The network I/F 108 includes a function as a FAX modem, and functions as an interface which is used when the image forming apparatus 1 performs FAX transmission and reception through a network.

The controller 100 is formed of a combination of software and hardware. Specifically, a program stored in a nonvolatile storage medium, such as the ROM 30 or a nonvolatile memory and the HDD 40 or an optical disk, is loaded on a volatile memory (hereinafter, referred to as a memory), such as the RAM 20. The controller 100 is constituted by a software controller which is constituted when the CPU 10 is operated in accordance with the program and hardware, such as an integrated circuit. The controller 100 functions as a control unit which performs overall control of the image forming apparatus 1.

The main control unit 110 functions to control the respective units of the controller 100, and provides commands to the respective units of the controller 100. The engine control unit 120 functions as a driving unit which controls or drives the printer engine 106, the scanner unit 102, and the like. The image processing unit 130 generates drawing information on the basis of image information to be printed and output under the control of the main control unit 110. The drawing information is information which is used when the printer engine 106 serving as an image forming unit draws an image to be formed in an image forming operation.

The image processing unit 130 processes imaging data input from the scanner unit 102 to generate image data. Image data is information which is stored in the storage area of the image forming apparatus 1 or is transmitted to the job management server 3 through the network I/F 108 as the result of the scanner operation.

The operation display control unit 140 displays information on the display panel 104 or gives notification of information input through the display panel 104 to the main control unit 110. The input/output control unit 150 inputs information input through the network I/F 108 to the main control unit 110. The main control unit 110 controls the input/output control unit 150 and accesses another apparatus, such as the client terminal 2 or the job management server 3, through the network I/F 108 and the network.

When image formation output is performed in the image forming apparatus 1, the log managing unit 160 stores the log information. When storing the log information, the log managing unit 160 provides information for identifying image formation output by a print job acquired through the job management server 3 or image formation output by a print job directly input from the client terminal 2. Log information of image formation output by a print job directly input from the client terminal 2 is transmitted in accordance with access from the job management server 3.

When the image forming apparatus 1 operates as a printer, first, the input/output control unit 150 receives a print job through the network I/F 108. That is, the input/output control unit 150 functions as a print data acquiring unit. The input/output control unit 150 transfers the received print job to the main control unit 110. When the print job is received, the main control unit 110 performs control such that the image processing unit 130 generates drawing information on the basis of document information or image information included in the print job.

When the drawing information is generated by the image processing unit 130, the engine control unit 120 performs control such that the printer engine 106 performs image formation on a sheet fed from the paper feeding table 105 on the basis of the generated drawing information. That is, the image processing unit 130, the engine control unit 120, and the printer engine 106 function as a print output unit. As a specific form of the printer engine 106, an ink jet type image forming mechanism, an electrophotographic image forming mechanism, or the like may be used. A document which is subjected to image formation by the printer engine 106 is discharged to the discharge tray 107. During this process, the log managing unit 160 stores the log information in a storage medium, such as the HDD 40, under the control of the main control unit 110. That is, the log managing unit 160 functions as a history information holding unit of the image forming apparatus.

Figure 4:
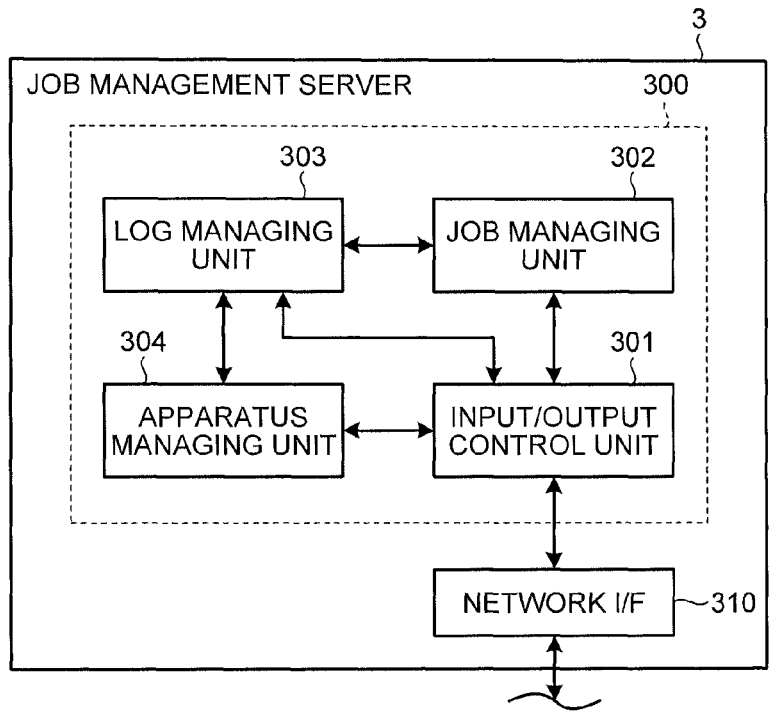
FIG. 4 is a block diagram illustrating the functional configuration of a job management.

Next, the functional configuration of the job management server 3 of this embodiment will be described with reference to FIG. 4. As illustrated in FIG. 4, the job management server 3 of this embodiment has a controller 300 and a network I/F 310. The controller 300 includes an input/output control unit 301, a job managing unit 302, a log managing unit 303, and an apparatus managing unit 304.

The network I/F 310 is an interface which is used when the job management server 3 performs communication with another apparatus, such as the image forming apparatus 1 or the client terminal 2, through a network. Ethernet (Registered Trademark) or a USB interface is used.

Similarly to the controller 100 of the image forming apparatus 1, the controller 300 is formed of a combination of software and hardware, and functions as a control unit which controls the job management server 3. Similarly to the input/output control unit 150 of the image forming apparatus 1, the input/output control unit 301 controls transmission and reception of information through the network I/F 310.

The job managing unit 302 primarily stores a print job, which is received by the input/output control unit 301 from the client terminal 2 through the network, into the storage medium, such as the HDD 40. The print job stored in the storage medium is read and is output in accordance with access from the image forming apparatus 1. That is, the input/output control unit 301 functions as a command reception unit, and the job managing unit 302 functions as a print data managing unit and a request print data transmission unit. The apparatus managing unit 304 holds information for managing the apparatus, such as the network address of the image forming apparatus 1 as a print job management target, that is, in this embodiment, the network addresses of the image forming apparatus 1a and the image forming apparatus 1b, or the like, and manages the image forming apparatus 1.

The log managing unit 303 stores the history of the print job into the storage medium, such as the HDD 40, as the print job is stored and output by the job managing unit 302. This embodiment resides in that the log managing unit 303 performs centralized management of log information of image formation output in the image forming apparatus 1a and the image forming apparatus 1b. For this reason, when the job management server 3 returns from the disabled state, the log managing unit 303 of this embodiment acquires the log information of image formation output from the image forming apparatus 1 through the input/output control unit 301. That is, the log managing unit 303 functions as a history information generating unit, a history information acquiring unit, and a history information managing unit of an image formation control device.

Figure 5:
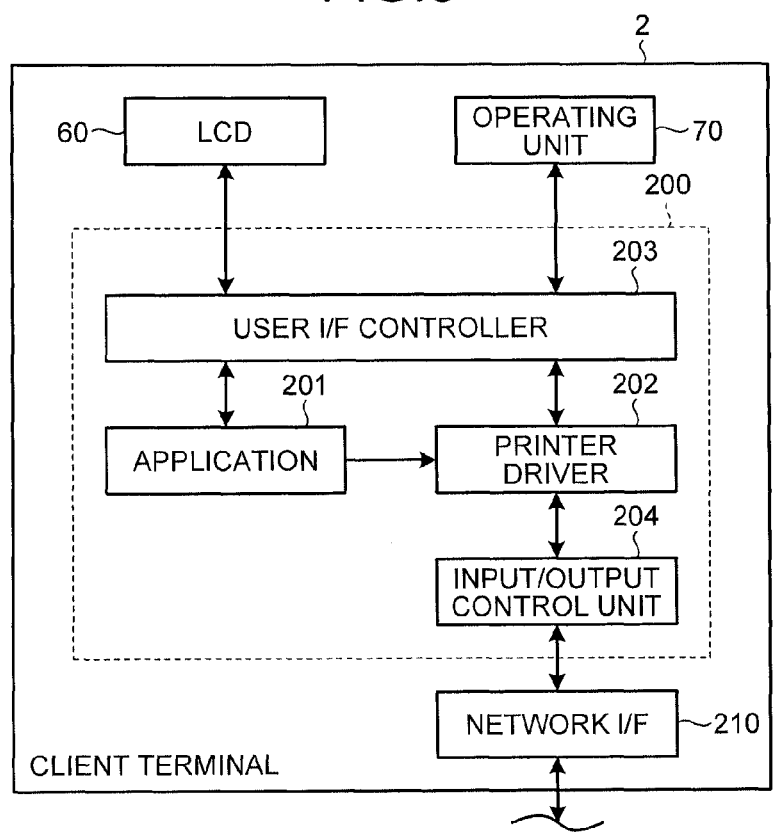
FIG. 5 is a block diagram illustrating the functional configuration of a client terminal.

Next, the functional configuration of the client terminal 2 of this embodiment will be described with reference to FIG. 5. As illustrated in FIG. 5, the client terminal 2 of this embodiment has a controller 200 and a network I/F 210, in addition to the LCD 60 and the operating unit 70 described in the embodiment The controller 200 includes an application 201, a printer driver 202, a user I/F controller 203, and an input/output control unit 204.

The network I/F 210 is an interface which is used when the client terminal 2 performs communication with another apparatus, such as the image forming apparatus 1 or the job management server 3, through a network. Ethernet (Registered Trademark) or a USE interface is used.

Similarly to the controller 100 of the image forming apparatus 1, the controller 200 is formed of a combination of software and hardware, and functions as a control unit which controls the client terminal 2. Similarly to the input/output control unit 150 of the image forming apparatus 1, the input/output control unit 204 controls transmission and reception of information through the network I/F 310.

The application 201 is a software application which is constituted such that the CPU 10 performs an arithmetic operation (or, calculating operation) in accordance with a software program installed in the client terminal 2, and which allows the user to perform browsing, editing, managing, and the like on image information or document information. The user performs image formation output for the image information or the document information through the application 201.

When an instruction to perform image formation output is issued through the application 201, the printer driver 202 generates a print job on the basis of image information or document information to be subjected to image formation output, and transmits the print job to the image forming apparatus 1 or the job management server 3 through the input/output control unit 204. That is, the printer driver 202 functions as a print data generating unit and a print data transmission unit. The print job generated by the printer driver 202 is information which is described in a page description language (PDL).

The user I/F controller 203 displays a graphical user interface (GUI) of the application 201 or the printer driver 202 on the LCD 60, and inputs information input by the user through the operating unit 70 to the application 201 or the printer driver 202.

The normal operation of a pull print system having the configuration will be described with reference to FIG. 6. FIG. 6 is a sequence diagram illustrating the normal operation of the pull print system of this embodiment. In the client terminal 2, when the print job is generated on the basis of an operation of the user, as illustrated in FIG. 6, in S601, the printer driver 202 transmits the print job to the job management server 3 through the input/output control unit 204. In the job management server 3, in S602, the input/output control unit 301 receives the print job, and the job managing unit 302 stores the print job in a storage medium, such as the HDD 40.

After operating the client terminal 2 to output the print job, the user operates the image forming apparatus 1. Accordingly, in S603, the image forming apparatus 1 acquires a list (job list) of print jobs from the job managing unit 302 of the job management server 3 through the network, and displays the job list on the display panel 104. At this time, user authentication or the like is performed to increase security, so that only the print job of the user is acquired.

Figure 7:
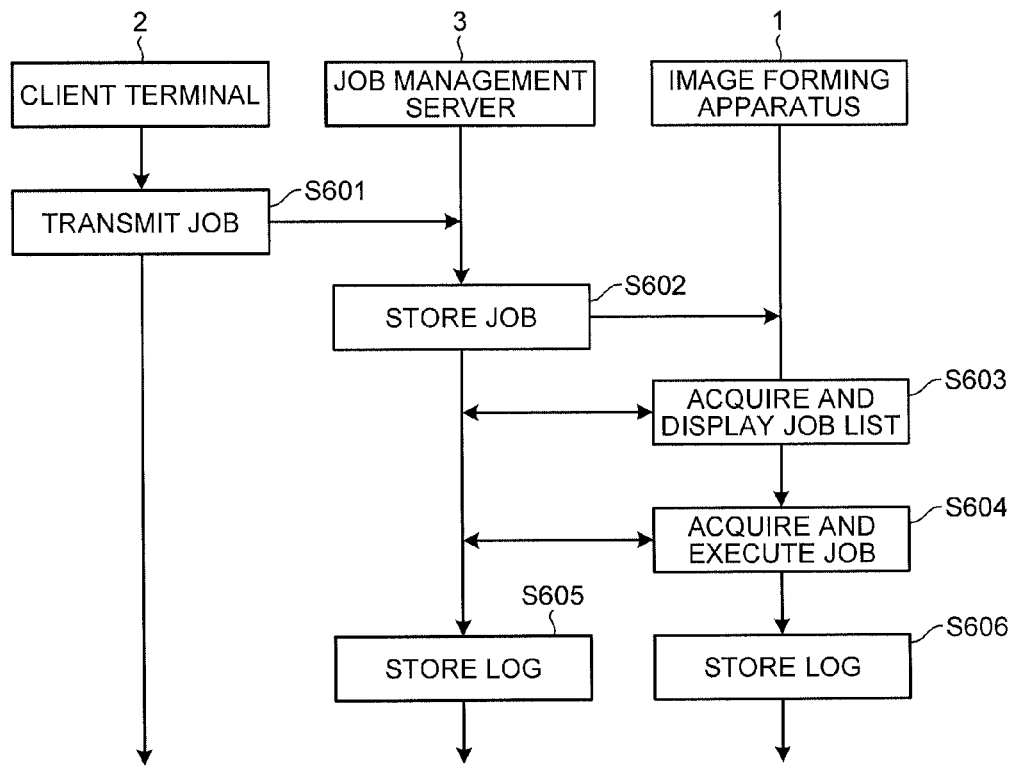
FIG. 7 is a diagram illustrating an example of log information.

The user operates the display panel 104 and selects a print job to be performed from among the displayed print jobs. Accordingly, in S604, the image forming apparatus 1 acquires the selected print job from the job management server 3 through the network and performs image formation output. In the job management server 3, in S605, the print job is output in accordance with access from the image forming apparatus 1 and log information is stored. In the image forming apparatus 1, in S606, the log information is stored as image formation output is performed. At the process of S605 and S606, the log information illustrated in FIG. 7 is generated in the log managing unit 160 and the log managing unit 303, and is stored in a storage medium, such as the HDD 40.

The acquisition of the print job may be performed when acquiring the job list. That is, in S603, the image forming apparatus 1 acquires the print job and the job list of the print job from the job managing unit 302 of the job management server 3. The job list is displayed on the display panel 104, and when the print job is selected by the user, the image forming apparatus 1 extracts the selected print job from among the print jobs stored in the storage medium, and performs image formation output.

Next, a characteristic operation of the pull print system of this embodiment will be described with reference to FIG. 8. As illustrated in FIG. 8, in the client terminal 2 in S801, when a print job is generated on the basis of an operation of the user, the printer driver 202 confirms the operation state of the job management server 3 through the input/output control unit 204. With the confirmation in S801, when it is confirmed that the job management server 3 is in the disabled state in S802, the printer driver 202 transmits the print job to the image forming apparatus 1.

At the process of S802, the printer driver 202 determines to which of the image forming apparatus 1a and the image forming apparatus 1b the print job will be transmitted and then transmits the print job. An apparatus to which the print job will be transmitted is determined by setting information defined in advance or designation of a user operation.

In the image forming apparatus 1, in S803, the input/output control unit 150 receives the print job, and image formation output is performed under the control of the main control unit 110. As described above, since the system of this embodiment is of pull print system, it is preferable that the process of S803, which is an outputting of formed image when a print job is directly input from the client terminal 2 to the image forming apparatus 1, is performed in accordance with an operation of the user on the image forming apparatus 1.

Under this control, for example, after the input/output control unit 150 receives the print job, the main control unit 110 temporarily stores the print job in a storage medium, such as the HDD 40. That is, the main control unit 110 functions as a print data storage unit. The main control unit 110 can be formed of reading the print job temporarily stored in the storage medium in accordance with an operation of the user, that is, an operation signal input through the operation display control unit 140, and performing an image formation output process in accordance with the print job. When image formation output is performed in the image forming apparatus 1, in S804, the log managing unit 160 stores a log into the storage medium.

Through S804, log information illustrated in FIG. 9A is stored in the log managing unit 160. As illustrated in FIG. 9A, in the case of the log information of the print job which is directly transmitted from the client terminal 2 to the image forming apparatus 1 and executed, the value "Yes" is input to the item "direct printing". The value "Yes" in the item "direct printing" is identification information which identifies image formation output performed in accordance with the print job directly input from the client terminal 2.

Thereafter, in S805, when the job management server 3 returns from the disabled state, in S806, the log managing unit 303 of the job management server 3 accesses the image forming apparatus 1 through the input/output control unit 301, and inquires about the presence/absence of the log information of the print job (hereinafter, referred to as a direct print job) directly input from the client terminal 2 to the image forming apparatus 1. When there is the log information of the direct print job, that is, the log information where the value of the item "direct printing" is "Yes", in S807, the log managing unit 303 acquires the log information from the image forming apparatus 1 and stores the log information into the storage medium.

When the log information stored in the log managing unit 303 is in the state illustrate in FIG. 9B before the process of S807 is performed, after the process of S807, that is, after the log information illustrated in FIG. 9A is acquired, the state illustrate in FIG. 9C is reached. As illustrated in FIG. 9C, with regard to the log information of the direct print job, the value "1a" which is a value indicating the execution in the image forming apparatus 1a is set to the item "direct printing".

In the image forming apparatus 1, when the log information of the direct print job is acquired by the job management server 3, as illustrated in FIG. 9D, the log managing unit 303 updates the log information such that the value of the item "direct printing" is changed to "collected". Accordingly, when the job management server 3 acquires the log information concerning the direct print job again, it is possible to avoid the same log information from being acquired double.

Figure 10:
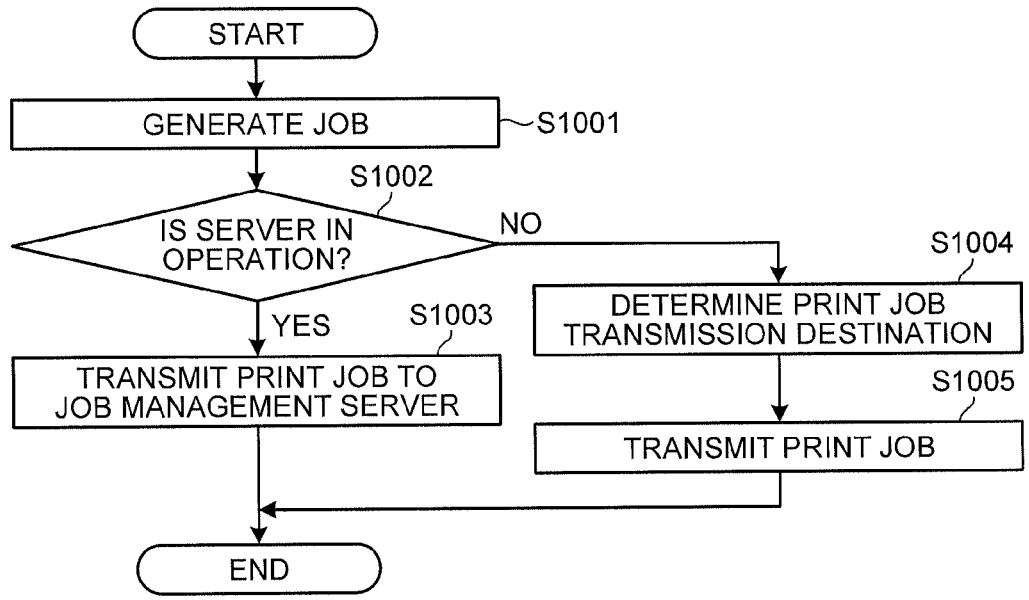
FIG. 10 is a flowchart illustrating the operation of a client terminal.

Next, the operations of the client terminal 2 and the job management server 3 in the overall operation of the system illustrated in FIG. 8 will be described. FIG. 10 is a flowchart illustrating the operation of the client terminal 2. As illustrated in FIG. 10, in S1001, when a job is generated by an operation of the user in the client terminal 2, in S1002, the printer driver 202 confirms whether or not the job management server 3 is in operation through the network, that is, whether or not a print job is receivable. The process of S1002 corresponds to the process of S801 of FIG. 8.

As the result of the confirmation of S1002, when the job management server 3 is in operation (YES in S1002), in S1003, the printer driver 202 transmits the print job to the job management server 3 and ends the process. The process of S1003 corresponds to the process of S601 of FIG. 6. When the job management server 3 is not in operation, that is, when the print job is not receivable (NO in S1002), in S1004, the printer driver 202 determines the transmission destination of the print job from among the image forming apparatus 1a and the image forming apparatus 1b.

As a method in which the printer driver 202 determines the transmission destination of the print job in S1004, the printer driver 202 can acquire the state of the image forming apparatus 1 through the network regularly, and can select an operable apparatus at the timing of S1004. The attribute of the print job, such as the type of color/monochrome and duplex printing designation, may be acquired from the print job, and an apparatus according to the attribute can be selected. A plurality of methods may be combined.

When the transmission destination of the print job is determined, in S1005, the printer driver 202 transmits the print job to the determined transmission destination through the network and ends the process. The process of S1005 corresponds to the process of S802 of FIG. 8. With this process, even when the job management server 3 is in the disabled state, the print job can be transmitted.

Figure 11:
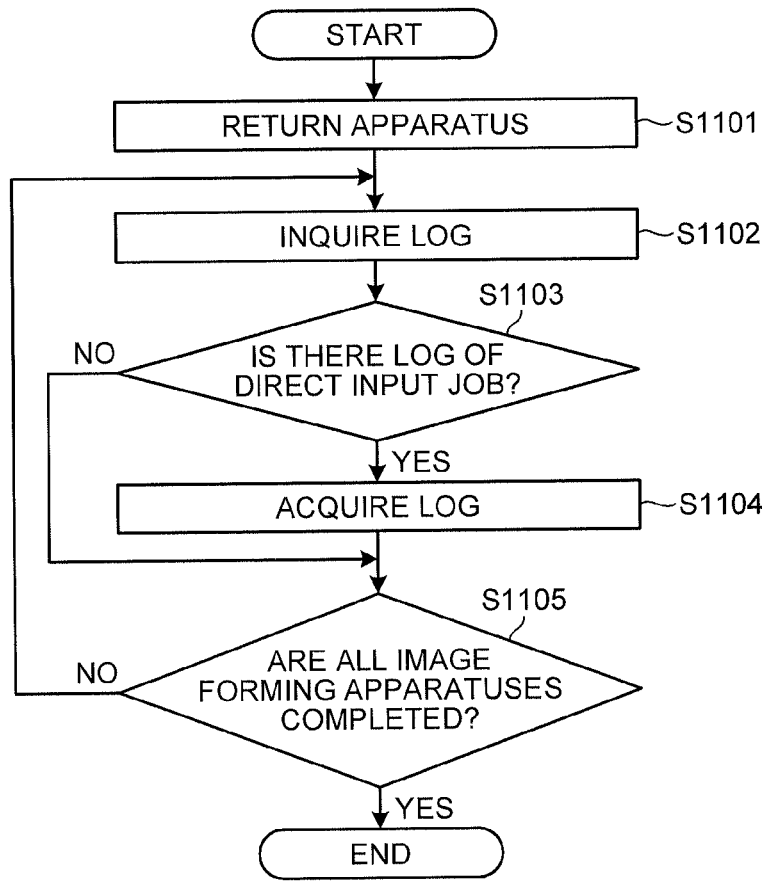
FIG. 11 is a flowchart illustrating an operation of a job management server.

FIG. 11 is a flowchart illustrating the operation of the job management server 3. As illustrated in FIG. 11, in S1101, when the job management server 3 returns from the disabled state, the log managing unit 303 inquires the image forming apparatus 1 of the presence/absence of the log information through the network in S1102. The process of S1101 corresponds to the process of S805 of FIG. 8, and the process of S1102 corresponds to the process of S806 of FIG. 8. In the image forming apparatus 1, the log managing unit 160 transmits a list of stored log information in response to the inquiry from the job management server 3.

In S1103, the log managing unit 303 which acquires a list of log information from the image forming apparatus 1 confirms the log information where the item "direct printing" is "Yes" as illustrated in FIG. 9A, that is, the presence/absence of the log of the direct print job. When there is the direct print job (YES in S1103), in S1104, the log information is acquired from the image forming apparatus 1 and stored. The process of S1104 corresponds to the process of S807 of FIG. 8.

The log managing unit 303 repeats the processes from S1102 to S1104 for all the image forming apparatuses 1 connected to the network, that is, in this embodiment, the image forming apparatus 1a and the image forming apparatus 1b (NO in S1105). After the processes from S1102 to S1104 are performed for all the image forming apparatuses 1 (YES in S1105), the process ends.

Although in FIG. 11, a case has been described where the condition of S1101, that is, the operation start condition refers to when the job management server 3 returns from the disabled state, the operation may be incorporated as a process in power-on reset of the job management server 3. That is, the operation of FIG. 11 is not limited to when the job management server 3 is in the disabled state due to an error or the like, and may be performed when the state where a print job is not receivable is changed to the state where a print job is receivable, such as power-on.

In FIG. 11, as described as the process of S1103 and S1104, a case where the determination of the direct print job is performed on the job management server 3 side has been described. As another modification, the job management server 3 may acquire all pieces of log information stored in the image forming apparatus 1, may store only log information which is not stored in the log managing unit 303, and may discard the remaining log information.

The job management server 3 may access the image forming apparatus 1 to acquire only the log information of the direct print job, and the log managing unit 160 of the image forming apparatus 1 may transmit only the log information of the direct print job with the item "direct printing" of "Yes" from among the stored log information to the job management server 3. The access to the image forming apparatus 1 to acquire only the direct print job can be defined as, for example, a notification (hereinafter, referred to as a return notification) that the job management server 3 returns from the disabled state. That is, when the image forming apparatus 1 receives the return notification from the job management server 3, the log information of the direct print job may be transmitted to the job management server 3. In this case, the log managing unit 303 functions as a state notification unit which gives notification of the state where the job management server 3 can receive the print job.

As described above, in the pull print system of this embodiment, when the job management server 3 is in the disabled state, the client terminal 2 transmits the direct print job to the image forming apparatus 1, thereby avoiding output from being disabled. With regard to the log information concerning the direct print job, the image forming apparatus 1 adds information (hereinafter, referred to as a direct printing flag) for identifying image formation output by a print job directly input from the client terminal 2, like the value "Yes" of the item "direct printing".

When having returned from the disabled state, the job management server 3 accesses the image forming apparatus 1 to acquire log information added with a direct printing flag. Accordingly, log information of image formation output performed by the direct print job while the job management server 3 is in the disabled state is stored in the job management server 3, such that centralized management of the log information can be performed in the job management server 3.

This embodiment is premised on the pull print system. For this reason, at the timing at which the job management server 3 has returned from the disabled state, there may be a print job on standby in the image forming apparatus 1, that is, after a print job is directly input from the client terminal 2 to the image forming apparatus 1, there may be a print job which is not yet subjected to image formation output. In this case, it is preferable that the job management server 3 acquires the print job from the image forming apparatus 1, and returns to the normal sequence described in FIG. 6. The operation of the job management server 3 for enabling the above-described form will be described with reference to FIG. 12.

FIG. 12 is a flowchart illustrating the operation of the job management server 3 described above. As illustrated in FIG. 12, in steps from S1201 to S1204, the same process as from S1101 to S1104 of FIG. 11 is performed. In S1204, when the log information concerning the direct print job is acquired, next, in S1205, the job managing unit 302 inquires about the presence/absence of an unprocessed and standby print job (hereinafter, referred to as a standby job) in the image forming apparatus 1.

In the image forming apparatus 1, in response to the inquiry from the job management server 3, the main control unit 110 notifies the job management server 3 of the presence/absence of a standby job stored in a storage medium such as the HDD 40. As the result of the notification from the image forming apparatus 1, when there is a standby job (YES in S1205), the job management server 3 requests the image forming apparatus 1 to transmit the standby job. That is, the job managing unit 302 functions as a print data acquisition requesting unit.

When the request from the job management server 3 is received, in the image forming apparatus 1, the main control unit 110 reads the standby job stored in the storage medium, such as the HDD 40, and transmits the standby job to the job management server 3. That is, the main control unit 110 functions as an unprocessed data transmission unit. In the job management server 3, in S1206, the input/output control unit 301 receives the standby job transmitted from the image forming apparatus 1, and the job managing unit 302 acquires the standby job. Accordingly, as in S602 of FIG. 6, the job managing unit 302 stores the print job.

Thereafter, as in the S1105 of FIG. 11, the process of S1202 to S1206 repeats until the process is completed for all the image forming apparatuses 1 (NO in S1207), and after the process of S1202 to S1206 for all the image forming apparatuses 1 is performed (YES in S1207), the process ends.

With this process, the print job on standby is temporarily stored by the job managing unit 302 of the job management server 3, and thereafter, image formation output is performed by the normal operation illustrated in FIG. 6. At the timing at which the job management server 3 has returned, when a print job on standby is not stored as log information in the image forming apparatus 1, the log information is not collected in the job management server 3 depending on the operation illustrated in FIG. 8. Meanwhile, as illustrated in FIG. 12, a print job on standby is collected by the image forming apparatus 1, and centralized management of log information can be performed without omission.

According to the embodiment, in the pull print system, it is possible to allow centralized management of log information while the server is in the disabled state.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming system comprising:
an image forming apparatus configured to,
  print data associated with a print job on a recording medium,
  generate history information relating to the print job, the history information including identification information identifying whether the print job that has been printed is associated with a first operation or a second operation, and
  transmit the history information;
a print data management device configured to,
  if the print job is associated with the first operation, generate log information associated with the print job, and provide the print data to the image forming apparatus, and
  if the print job is associated with the second operation, receive the history information from the image forming apparatus, and store the history information received from the image forming apparatus in a memory associated with the print data management device; and
an information processing apparatus configured to,
  generate the print data,
  transmit the print data to the print data management device, if the print data is associated with the first operation and the print data management device is in an enabled state,
  transmit the print data to the image forming apparatus, if the print data is associated with the second operation, and
  transmit the print data to the image forming apparatus, if the print data management device is in a disabled state.

2. The image forming system according to claim 1, wherein the print data management device is configured to acquire the history information when the print data management device transitions from the disabled state to the enabled state.

3. The image forming system according to claim 2, wherein the print data management device is configured to transmit
  a notification to the image forming apparatus, the notification indicating that the print data management device has transitioned to the enabled state, and
  the image forming apparatus is configured to send the history information including the identification information to the print data management device in response to the notification.

4. The image forming system according to claim 1, wherein the image forming apparatus includes,
  a memory associated with the image forming apparatus, the memory associated with the image forming apparatus configured to store the print data, and
  an interface configured to transmit the print data stored in the memory associated with the image forming apparatus to the print data management device in response to a request therefrom; and
  the print data management device is configured to request the image forming apparatus to transmit the print data thereto.

5. The image forming system of claim 1, wherein the image forming apparatus is configured to receive the print data from either the print data management device and the information processing apparatus based on (i) whether the print job is associated with the first operation or the second operation, and (ii) whether the print data management device is in the enabled state,
  the first operation being a pull-print operation in which the image forming apparatus receives accumulated print data from the print data management device, and
  the second operation being a direct-print operation in which the image forming apparatus receives the print data directly from the information processing apparatus.

6. An image forming apparatus comprising:
a processor configured to,
  receive print data associated with a print job from a print data management device, if the print data is associated with a first operation and the print data management device is in an enabled state,
  receive the print data from an information processing apparatus, if the print data is associated with a second operation,
  receive the print data from the information processing apparatus, if the print data management device is in a disabled state,
  print the print data associated with the print job on a recording medium,
  generate history information relating to the print job, the history information including identification information identifying whether the print job that has been printed is associated with the first operation or the second operation, and
  transmit the history information to the print data management device.

7. The image forming apparatus according to claim 6, wherein, the image forming apparatus is configured to transmit the history information to the print data management device when the print data management device transitions from the disabled state to the enabled state.

8. The image forming apparatus according to claim 7, wherein the image forming apparatus is configured to,
  receive, from the print data management device, a notification, the notification indicating that the print data management device has transitioned to the enabled state, and
  send the history information including the identification information to the print data management device in response to the notification.

9. The image forming apparatus according to claim 6, further comprising:
  a memory configured to store the print data, and
  an interface configured to transmit the print data stored in the memory to the print data management device in response to a request therefrom.

10. The image forming apparatus of claim 6, wherein
the image forming apparatus is configured to receive the print data from either the print data management device and the information processing apparatus based on (i) whether the print job is associated with the first operation or the second operation, and (ii) whether the print data management device is in the enabled state,
  the first operation being a pull-print operation in which the image forming apparatus receives accumulated print data from the print data management device, and
  the second operation being a direct-print operation in which the image forming apparatus receives the print data directly from the information processing apparatus.

11. A method of controlling an image forming apparatus included in an image forming system, the method comprising:
  receiving print data associated with a print job from a print data management device included in the image forming system, if the print data is associated with a first operation and the print data management device is in an enabled state;

receiving the print data from an information processing apparatus included in the image forming system, if the print data is associated with a second operation;

receiving the print data from the information processing apparatus, if the print data management device is in a disabled state;

printing the print data associated with the print job on a recording medium;

generating history information relating to the print job, the history information including identification information identifying whether the print job that has been printed is associated with the first operation or the second operation; and transmitting the history information to the print data management device.

12. The method according to claim 11, further comprising:

transmitting the history information to the print data management device when the print data management device transitions from the disabled state to the enabled state.

13. The method according to claim 12, further comprising:

receiving, from the print data management device, a notification, the notification indicating that the print data management device has transitioned to the enabled state; and sending the history information including the identification information to the print data management device in response to the notification.

14. The method according to claim 11, further comprising:

storing the print data in a memory associated with the image forming apparatus; and transmitting, via an interface, the print data stored in the memory to the print data management device in response to a request therefrom.

15. The method of claim 11, wherein the image forming apparatus is configured to receive the print data from either the print data management device and the information processing device apparatus based on (i) whether the print job is associated with the first operation or the second operation, and (ii) whether the print data management device is in the enabled state, the first operation being a pull-print operation in which the image forming apparatus receives accumulated print data from the print data management device, and the second operation being a direct-print operation in which the image forming apparatus receives the print data directly from the information processing apparatus.

* * * * *